United States Patent [19]

Morini et al.

[11] Patent Number: 4,923,122

[45] Date of Patent: May 8, 1990

[54] PERFECTED ELECTROMAGNETIC FUEL INJECTOR

[75] Inventors: Francesco Morini; Paolo Bortolotti, both of Bologna, Italy

[73] Assignee: Weber S.r.l., Turin, Italy

[21] Appl. No.: 290,156

[22] Filed: Dec. 27, 1988

[30] Foreign Application Priority Data

Dec. 24, 1987 [IT] Italy .............................. 68123 A/87

[51] Int. Cl.[5] .............................................. F16K 31/02

[52] U.S. Cl. ............................... 239/585; 251/129.16; 251/129.18

[58] Field of Search ................... 239/585; 251/129.15, 251/129.16, 129.18, 129.21

[56] References Cited

U.S. PATENT DOCUMENTS

| | | | |
|---|---|---|---|
| 4,394,973 | 7/1983 | Sauer et al. | 239/585 |
| 4,471,914 | 9/1984 | Hafner et al. | 251/129.16 |
| 4,597,558 | 7/1986 | Hafner et al. | 239/585 |
| 4,610,080 | 9/1986 | Hensley | 239/585 |
| 4,778,112 | 10/1988 | DeConcini et al. | 239/585 |

FOREIGN PATENT DOCUMENTS

| | | |
|---|---|---|
| 3332801 | 3/1985 | Fed. Rep. of Germany . |
| 2106831 | 5/1972 | France . |
| 2206795 | 7/1974 | France . |
| 2241697 | 3/1975 | France . |
| 297237 | 9/1928 | United Kingdom . |
| 1064679 | 4/1967 | United Kingdom . |

*Primary Examiner*—Andres Kashnikow
*Assistant Examiner*—Karen B. Merritt
*Attorney, Agent, or Firm*—Albert L. Jeffers; John F. Hoffman

[57] ABSTRACT

An electromagnetic injector featuring an anchor integral with a plunger and which is attracted, against the action of flexible means, towards a core having an electric winding; the injector itself presenting a casing housing the core and plunger, and which is divided, at the anchor, into two independent elements connected coaxially integral with each other, and between which is inserted a spacer element of nonmagnetic material, such as titanium or brass.

5 Claims, 1 Drawing Sheet

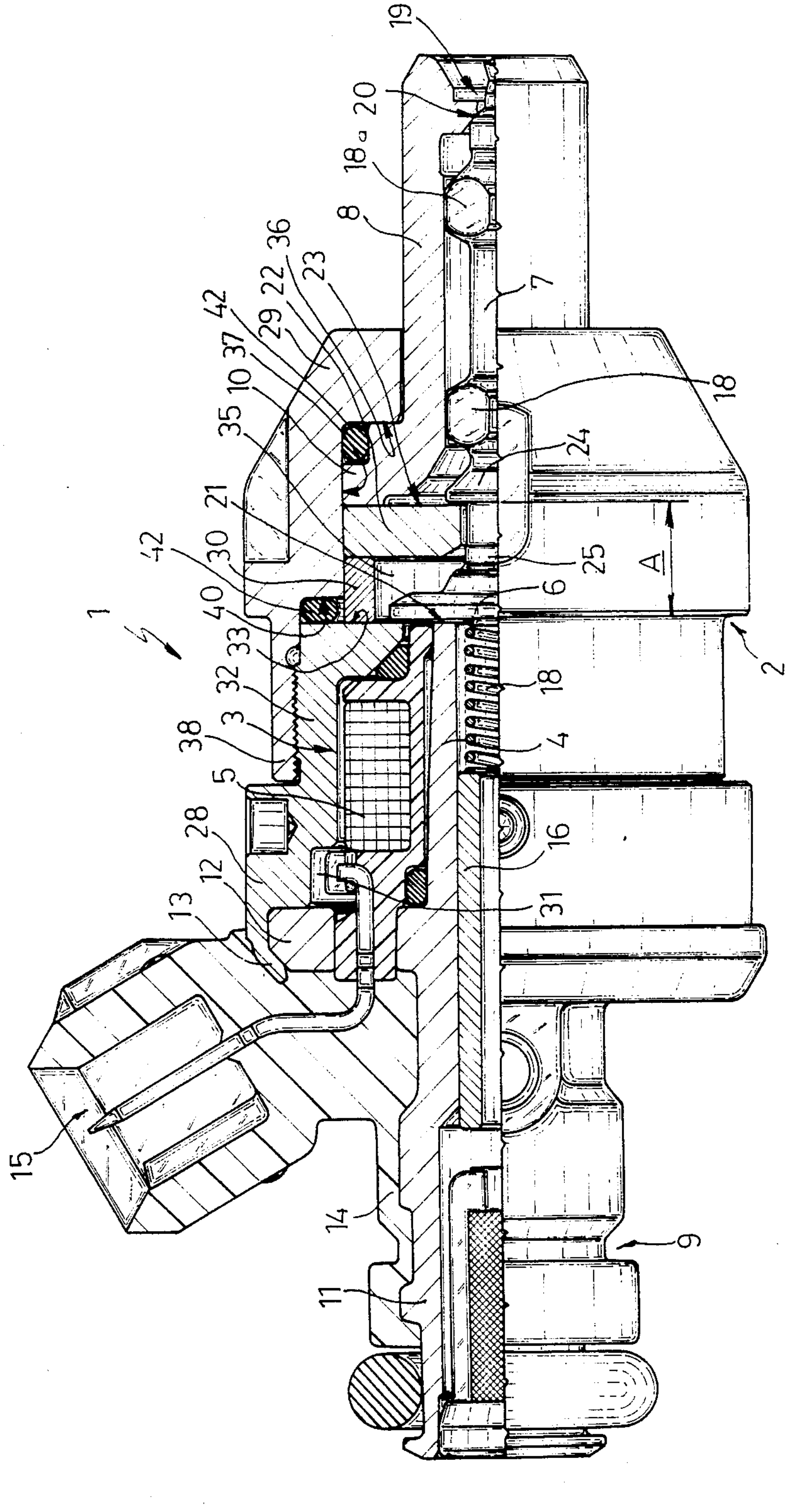
19
20
18a
8
7
36
23
22
42
29
37
10
35
18
24
21
30
42
25
A
6
40
33
1
32
18
2
3
38
4
5
28
16
12
31
13
15
14
9
11

PERFECTED ELECTROMAGNETIC FUEL INJECTOR

BACKGROUND OF THE INVENTION

The present invention relates to an electromagnetic fuel injector, particularly for supplying a motor vehicle internal combustion engine, and which provides for eliminating or reducing magnetic leakage towards the injection nozzle.

Electromagnetic fuel injectors are known to comprise a casing, usually made of steel or ferromagnetic material, with a projecting injection nozzle and housing a plunger for opening or closing the nozzle, an anchor integral with the plunger, and a core with an electric winding designed, when the winding is supplied with current, to attract the anchor and so operate the plunger for opening the nozzle for the required fuel injection time.

A major drawback of known injectors of the aforementioned type, especially those with anchors designed for radial closure of the electromagnetic flux, is that they are subject to a certain amount of leakage of the magnetic flux produced by the electromagnet, i.e. core and winding, controlling the plunger. Certain lines of force, in fact, may be closed across the casing and even along this casing and across the nozzle. As, for reasons of mechanical strength, both the nozzle and plunger are usually formed of ferromagnetic material, the electromagnetic attraction produced by such leakage results in the plunger sticking to the sealing seat on the nozzle, thus resulting in delayed opening of the nozzle, injection of less than the required amoung of fuel, and impaired performance of the injector as a whole.

SUMMARY OF THE INVENTION

The aim of the present invention is to provide a perfected electromagnetic fuel injector designed to minimise or totally eliminate magnetic leakage across the ferromagnetic casing of the injector, and which is, nevertheless, of straightforward, low-cost design.

With this aim in view, according to the present invention, there is provided an electromagnetic fuel injector comprising a casing formed at least partly of ferromagnetic material; a core having an electric winding; an anchor integral with a plunger and attracted to said core, against the action of flexible means, when said winding is supplied with electric current; and a nozzle, the opening of which is controlled by the axial position of said plunger in relation to the front face of said core facing said anchor; said plunger, said core with said winding, and said anchor being housed inside said casing; characterised by the fact that said casing is divided, substantially at said front face of said core, into two independent elements connected coaxially integral with each other; provision being made between said elements for a spacer element formed of nonmagnetic material; and one of said elements, the one directly contacting said plunger, also being formed of nonmagnetic material.

BRIEF DESCRIPTION OF THE DRAWING

A non-limiting embodiment of the present invention will be described by way of example with reference to the accompanying drawing showing a partially-sectioned longitudinal view of an electromagnetic fuel injector in accordance with the teachings of the present invention.

DETAILED DESCRIPTION OF THE INVENTION

Number 1 on the accompanying drawing indicates an electromagnetic fuel injector for supplying, in known manner, any known type of internal combustion engine (not shown), particularly a motor vehicle engine. Injector 1 comprises a casing 2, the magnetic-flux-affected portion of which is formed of ferromagnetic material, e.g. steel, and the rest of nonmagnetic material; an electromagnet 3 consisting of a tubular ferromagnetic core 4 and an electric winding 5 arranged coaxially on the outside of core 4; an anchor 6 also formed of ferromagnetic material and designed in such a manner as to be attracted by core 4 when winding 5 is supplied with electric current; a known type of plunger 7 secured integral with anchor 6; an injection nozzle 8 inside which plunger 7 slides; and a union 9 for feeding fuel inside casing 2. Casing 2 houses electromagnet 3, anchor 6 with plunger 7, and an annular locking portion 10 of nozzle 8, the rest of which projects axially outwards of casing 2. Union 9 seals off casing 2 in fluidtight manner on the opposite side to nozzle 8 and, according to the non-limiting embodiment shown, comprises a tubular inner element 11 formed in one piece with core 4 and having an outer flange 12 on to which edge 13 of casing 2 is clinched; and a synthetic plastic outer covering 14 incorporating element 11 and a known type of socket 15 for supplying electromagnet 3. Fuel is fed to nozzle 8 along a tube 16 fitted inside tubular core 4 and which also provides for axial arrest of a spring 18 acting on plunger 7. Plunger 7 is guided in sliding manner inside casing 2 and nozzle 8 by a pair of hexagonal flat portions 18*a*, and provides for feeding fuel to outlet 19 of nozzle 8 either by means of flat portions 18*a*, which form respective lateral channels between plunger 7 and the parts surrounding the same, or through plunger 7 itself, if this is of the known hollow tubular type. Outlet 19 is normally closed by plunger 7, which rests against a sealing seat 20 surrounding outlet 19, by virtue of the thrust exerted by spring 18. When electromagnet 3 is energized, outlet 19 is controlled by the axial position of plunger 7 in relation to the flat front face 21 of core 4 facing anchor 6, subsequent to anchor 6, with which plunger 7 is integral, being drawn towards core 4. Said axial position of plunger 7 is, in turn, determined by the position of a stop ring 22 housed in fixed manner inside casing 2, and the face 23 of which is contacted by an annular rib 24 on plunger 7, so as to produce a minimum air gap between anchor 6 and core 4, i.e. the axial distance remaining between face 21 and anchor 6 when electromagnet 3 is energized and nozzle 8 opened. Anchor 6 is inserted axially between ring 22 and core 4, is secured to end 25 of plunger 7, and supports spring 18 directly.

According to the present invention, casing 2, instead of being formed in one or a number of closely contacting parts as on known injectors, is divided, substantially at front face 21 of core 4, into two independent elements, 28 and 29, secured coaxially integral with each other and between which is provided a spacer element 30 of nonmagnetic material such as brass or titanium. In more detail, said first element 28 is formed of ferromagnetic material, is substantially cylindrical, and defines a first inner cavity 31 housing core 4, electric winding 5, spring 18 and fuel supply means defined by tube 16. Said element 28 terminates, towards nozzle 8, in a cylindrical, externally-threaded end 32 defined by a flat front surface 33 substantially flush with front face 21 of core 4 and machined so as to be perfectly coplanar with the same. Said second element 29 of casing 2 is formed of nonmagnetic material, is substantially cup-shaped, and defines a second inner cavity 35 housing anchor 6 and plunger 7 in axially sliding manner. Cavity 35 also houses stop ring 22 and nonmagnetic spacer element 30, which also consists of a ring similar to ring 22 but having a larger inside diameter for coaxially housing anchor 6. Nonmagnetic ring 30 is arranged coaxial with, and adjacent to, ring 22, is inserted in axially locked manner between front surface 33 of element 28 and an axial shoulder defined by an end wall 36 of element 29, and is of such an axial length as to prevent any contact between element 29 and surface 33. In more detail, rings 30 and 22 and annular portion 10 of nozzle 8 are inserted side by side and one after the other inside a cylindrical seat 37 defining part of cavity 35, and are packed by element 29 against surface 33 and between this and end wall 36 defining the end portion of seat 37. Element 29 terminates, towards element 28, in an internally-threaded sleeve portion 38 having a larger diameter than end 32 on to which it is screwed for connecting elements 28 and 29. Inside portion 38, spacer ring 30 projects axially from seat 37, in particular, in relation to an annular end wall 40 of sleeve portion 38, defining the front of seat 37, thus preventing, according to the present invention, any front contact between elements 28 and 29 of casing 2.

For preventing leakage of the pressurized fuel fed into casing 2, injector 1 also presents a pair of sealing rings 42, one between portion 10 and end wall 36, and the other between surface 33 and end wall 40. According to a further characteristic of the present invention, anchor 6 provides for radial closure of the electromagnetic flux, by virtue of being defined by a substantially flat disc of such a diameter as to face both front face 21 of core 4 and at least part of front end face 33 of element 28. In conjunction with the aforementioned characteristic, anchor 6 is secured to plunger 7 and machined so as to ensure a highly accurate predetermined distance A between itself and annular rib 24. Consequently, and by virtue also of the structure of casing 2 already described, the axial position of anchor 6 in relation to face 21 depends exclusively on distance A. Injector 1 according to the present invention may therefore be assembled with no need for calibrated stop rings 22, i.e. of various specifically selected thicknesses, the opening on injector 1 being regulated by simply inserting a non-calibrated, appropriately machined ring 22 and spacer 30. Ring 22 may, therefore, even be formed in one piece with spacer 30, for reducing the number of components on injector 1, though this may not always be convenient in view of the hardness and mechanical strength required of ring 22 for withstanding repeated impact with rib 24. As the mechanical strength of brass is insufficient for the purpose, and the ring 22 and spacer 30 assembly must perforce be nonmagnetic, a one-piece ring and spacer assembly would necessarily have to be formed entirely of high-cost titanium.

The advantages of injector 1 according to the present invention will be clear from the foregoing description. By dividing casing 2 at the air gap between the core and anchor, i.e. at face 21 of core 4; by frontally separating casing elements 28 and 29 by means of nonmagnetic spacer 30; and by forming the bottom portion from nonmagnetic material, flux lines are prevented from passing from element 28 to element 29 and, consequently, to nozzle 8, thus eliminating or greatly reducing "stick" between plunger 7 and sealing seat 20, as compared with known types of injectors. Moreover, assembly of injector 1 is simplified enormously by simply employing a radial flux closing anchor 6 integral with plunger 7, thus eliminating the need for calibrated plunger stop rings.

We claim:

1. An electromagnetic fuel injector comprising:

a casing including first and second elements, said first element formed of a ferromagnetic material;

a core including a front face;

an electric winding for said core for providing electromagnetic flux;

a plunger spaced away from said core;

a resilient bearing means;

an anchor comprising a substantially flat disc juxtaposed to and facing said front face, said anchor being integral with said plunger, said anchor and plunger being axially moveable and adapted to be attracted to said core against the action of said resilient biasing means when said winding is supplied with electric current, said anchor providing a radial electromagnetic flux path between said first element and said core;

a nozzle extending from said casing, said nozzle including an opening, said opening being controlled by the axial position of said plunger in relation to said front face of said core;

said first element defining a first cavity for housing said core, said electric winding, said resilient biasing means, and a fuel supply means, said first element including a first end surface which is substantially coplanar with said front face, said first end surface being juxtaposed to and facing at least a portion of said anchor;

said second element comprising a substantially cup-shaped element formed of a non-magnetic material and defining a second cavity for axially slidably receiving said anchor and at least a portion of said plunger, said second cavity having an end wall defining an axial shoulder, said second element further including a second end surface juxtaposed to and facing said first end surface;

a non-magnetic spacer element axially movably disposed between said first end surface and said axial shoulder, said spacer element having an axial length sufficient to prevent contact between said first end surface and said second end surface;

a plunger stop element disposed in said second cavity between said spacer element and said end wall; and an annular shoulder on said plunger for cooperating with said plunger stop element to define an end position of said plunger, said annular shoulder being spaced a predetermined distance from said anchor.

2. An injector as claimed in claim 1 wherein said first element terminates in a cylindrical, externally-threaded end which terminates in said front surface, said second element terminating in an internally-threaded sleeve portion for receiving said cylindrical threaded end to thereby interconnect said first and second elements to thereby form said casing.

3. An injector as claimed in claim 2 wherein said second cavity defines an axial seat, said spacer element and said stop element being received in said axial seat, said spacer element axially extending into said sleeve portion.

4. An injector as claimed in claim 3 wherein said spacer element and said plunger stop element are both defined by respective adjacently located coaxial rings, a sealing ring received between said first end surface and said second end surface, said sealing ring received in said axial seat.

5. An injector as claimed in claim 3 wherein said nozzle includes a lock portion, said lock portion disposed between said stop element and said end wall, said nozzle extending axially outwardly of said casing through an aperture in said second element in a direction opposite to and extending away from said first element.

* * * * *